US012586200B2

(12) United States Patent
Nordstrom et al.

(10) Patent No.: US 12,586,200 B2
(45) Date of Patent: Mar. 24, 2026

(54) PROBABLISTIC SEGMENTATION

(71) Applicant: RaySearch Laboratories AB (Publ), Stockholm (SE)

(72) Inventors: Marcus Nordstrom, Johanneshov (SE); Jonas Soderberg, Stockholm (SE); David Lidberg, Stockholm (SE)

(73) Assignee: Raysearch Laboratories AB, Stockholm (SE)

( * ) Notice: Subject to any disclaimer, the term of this patent is extended or adjusted under 35 U.S.C. 154(b) by 485 days.

(21) Appl. No.: 17/755,151

(22) PCT Filed: Oct. 20, 2020

(86) PCT No.: PCT/EP2020/079427
§ 371 (c)(1),
(2) Date: Apr. 22, 2022

(87) PCT Pub. No.: WO2021/078703
PCT Pub. Date: Apr. 29, 2021

(65) Prior Publication Data
US 2022/0383504 A1      Dec. 1, 2022

(30) Foreign Application Priority Data

Oct. 25, 2019      (EP) .................................... 19205323

(51) Int. Cl.
*G06T 7/11*                (2017.01)
(52) U.S. Cl.
CPC ...... *G06T 7/11* (2017.01); *G06T 2207/10081* (2013.01); *G06T 2207/20076* (2013.01); *G06T*

*2207/20081* (2013.01); *G06T 2207/20084* (2013.01); *G06T 2207/30004* (2013.01)

(58) Field of Classification Search
CPC ............. G06T 7/11; G06T 2207/10081; G06T 2207/20076; G06T 2207/20081; G06T 2207/20084; G06T 2207/30004; G06T 7/10; G06T 7/0012; G06T 2207/30096
See application file for complete search history.

(56) References Cited

U.S. PATENT DOCUMENTS

| | | |
|---|---|---|
| 2015/0055842 A1 | 2/2015 | Codella et al. |
| 2019/0197358 A1 | 6/2019 | Madani et al. |
| 2019/0244357 A1 | 8/2019 | Harouni et al. |
| 2019/0318474 A1 | 10/2019 | Han |

OTHER PUBLICATIONS

Wang, G., Zuluaga, M.A., Li, W., Pratt, R., Patel, p. A., Aertsen, M., Doel, T., David, A.L., Deprest, J., Ourselin, S. and Vercauteren, T., 2018. DeeplGeoS: a deep interactive geodesic framework for medical image segmentation. IEEE transactions on pattern analysis and machine intelligence, 41(7), pp. 1559-1572.*

(Continued)

*Primary Examiner* — Zhitong Chen
(74) *Attorney, Agent, or Firm* — Noréns Patentbyrå AB

(57)      ABSTRACT

A machine learning system may be used for determining if a segmentation of a medical image is a reasonable segmentation in the sense that it is a segmentation that could be made by a human user and does not contain any impossible combinations of pixel values. The method is enhanced by user input to avoid the impossible combinations.

9 Claims, 2 Drawing Sheets

(56) References Cited

OTHER PUBLICATIONS

Wang, G., Li, W., Zuluaga, M.A., Pratt, R., Patel, P.A., Aertsen, M., Doel, T., David, A.L., Deprest, J., Ourselin, S. and Vercauteren, T., 2018. Interactive medical image segmentation using deep learning with image-specific fine tuning. IEEE transactions on medical imaging, 37(7), pp. 1562-1573.*

Karasulu, B. and Korukoglu, S., 2011. A simulated annealing-based optimal threshold determining method in edge-based segmentation of grayscale images. Applied Soft Computing, 11(2), pp. 2246-2259.*

Yi, X., Walia, E. and Babyn, P., 2019. Generative adversarial network in medical imaging: A review. Medical image analysis, 58, p. 101552.*

ArXiv:1908.09979v1 https://doi.org/10.48550/arXiv.1908.09979.*

European Search Report dated Feb. 10, 2020 from European Patent Office, Rijswijk, Netherlands.

Office Action dated May 16, 2023 from European Patent Office, Munich, Germany.

Guilherme Aresta et al, "iW-Net: an automatic and minimalistic interactive lung nodule segmentation deep network", arxiv.org, Cornell University Library, 201 Olin Library Cornell University Ithaca, NY 14853,Nov. 30, 2018 (Nov. 30, 2018), abstract, sections I.A and II.

Guotai Wang et al, "Interactive Medical Image Segmentation using Deep Learning with Image-specific Fine-tuning", arxiv.org, Cornell University Library, 201 Olin Library Cornell University Ithaca, NY 14853, Oct. 11, 2017 (Oct. 11, 2017), abstract, figure 1, section II.

Guotai, Wang et A: "DeepIGeoS: A Deep Interactive Geodesic Framework for Medical Image Segmentation", Jul. 3, 2017, Sections 2.2 and 3, arkiv. org. Cornell University Library, Ithaca, NY, USA.

Gupta Divam, "A Beginner's guide to Deep Learning based Semantic Segmentation using Keras", Jun. 6, 2019 (Jun. 6, 2019), Retrieved from the Internet: URL:https://divamgupta.com/image-segmentation/2019/06/06/deep-learning-semantic-segmentation-keras.html[retrieved on Apr. 12, 2021].

Lundervold Alexander Selvikvåg et al, "An overview of deep learning in medical imaging focusing on MRI", Zeitschrift Fuer Medizinische Physik, vol. 29, No. 2, May 2019 (May 2019), p. 102-127, sections 2 and 3.2.1.

Nima Tajbakhsh et al, "Embracing Imperfect Datasets: A Review of Deep Learning Solutions for Medical Image Segmentation", arxiv. org, Cornell University Library, 201 Olin Library Cornell University Ithaca, NY 14853,Aug. 27, 2019 (Aug. 27, 2019), abstract, section 4.3.2.

Pedro Costa et al, "End-to-End Adversarial Retinal Image Synthesis", IEEE Transactions on Medical Imaging, vol. 37, No. 3, Mar. 2018 (Mar. 2018), p. 781-791.

Thomas Sakinis, et al. Interactive segmentation of medical images through fully convolutional neural networks, ARXIV.org, Mar. 19, 2019 Cornell University Library, 201 Olin Library Cornell University Ithaca NY.

International Search Report & Written Opinion, European Patent Office, May 7, 2021, Rijswijk, Netherlands.

Office action in corresponding Chinese application No. 202080073379.2, Chinese Patent Office, Beijing, China.

Oktay et al. Anatomically Constrained Neural Networks (ACNNs): Application to Cardiac Image Enhancement and Segmentation , Issue date 2018, IEEE Transactions on Medical Imaging,2018, vol. 37, Issue: 2 , Issue date 2018, IEEE, pp. 384-395, https://ieeexplore.ieee.org/stamp/stamp.jsp?tp=&arnumber=8051114.

Yu et al., 3D cGAN based cross / modality MR image synthesis for brain tumor segmentation, 2018 IEEE 15th International Symposium on Biomedical Imaging (ISBI 2018 , Issue date2018, IEEE, p. 626 / 630, https://ieeexplore.ieee.org/stamp/stamp.jsp?tp=&arnumber=8363653.

Office Action dated Aug. 6, 2024 in corresponding Japanese patent application No. 2022-523852, Japan Patent Office, Tokyo, Japan.

Guotai, Wang et a: "DeepIGeoS: A Deep Interactive Geodesic Framework for Medical Image Segmentation", Sep. 19, 2017, ArXiv: 1707.00652v3 [cs.CV]. Note! Already included in an IDS on Apr. 22, 2022.

Thomas Sakinis, et al. Interactive segmentation of medical images through fully convolutional neural networks, ARXIV.org, Mar. 19, 2019. arXiv:1903.08205v1 [cs.CV] Note! Already included in an IDS on Apr. 22, 2022.

Office action dated Mar. 5, 2025 in corresponding Indian patent application No. 202217018374, Indian Patent Office, New Delhi, India.

* cited by examiner

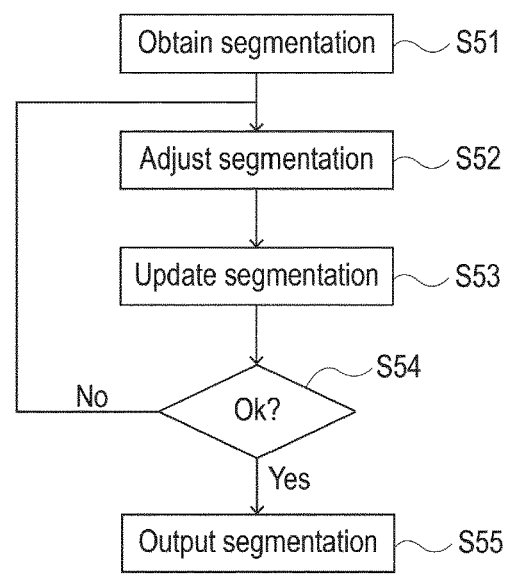
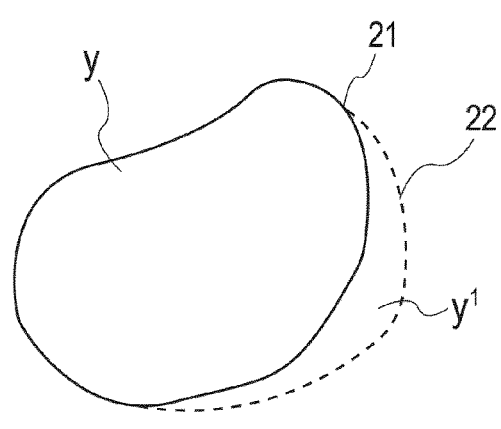
FIGURE 1
FIGURE 2
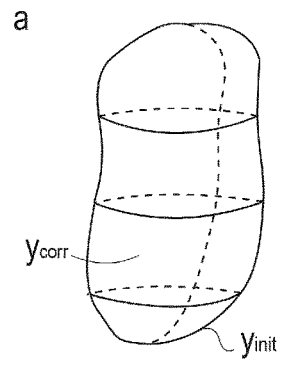
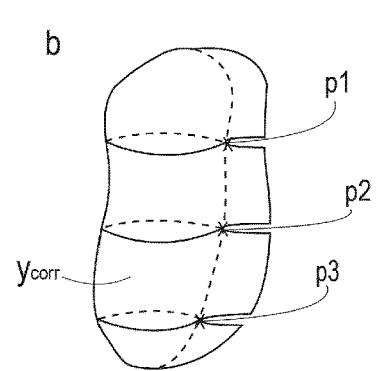
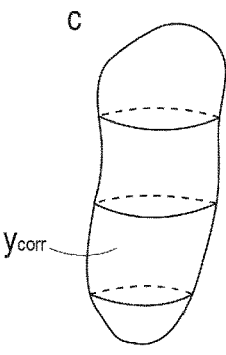
FIGURE 3
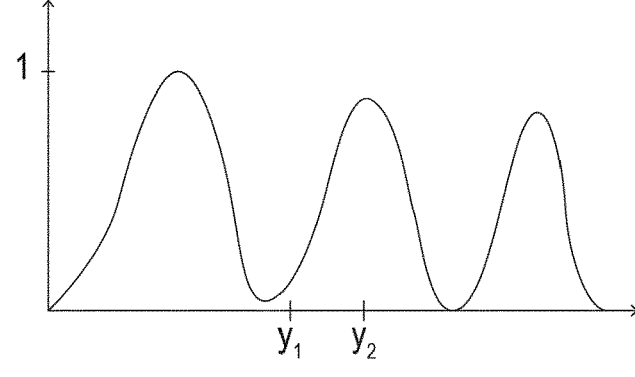
FIGURE 4

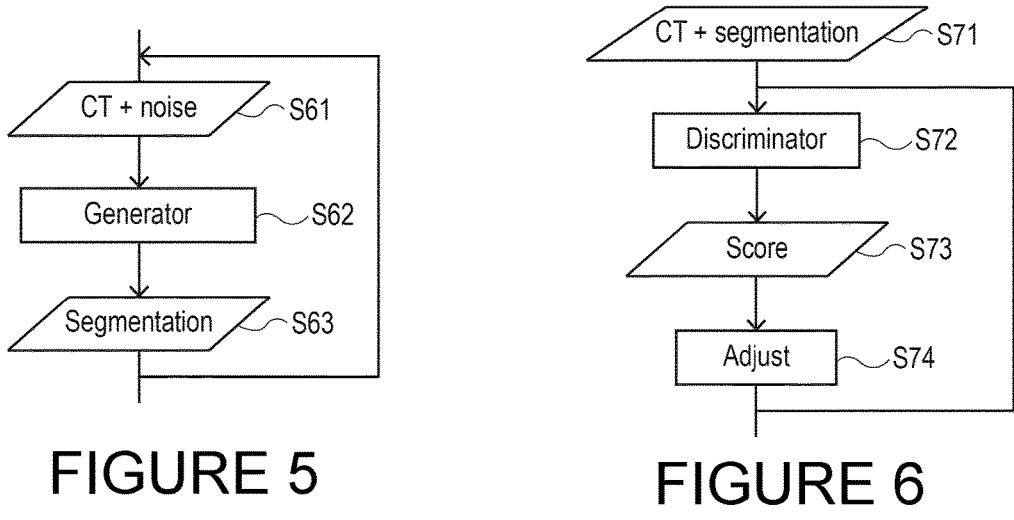
FIGURE 5
FIGURE 6
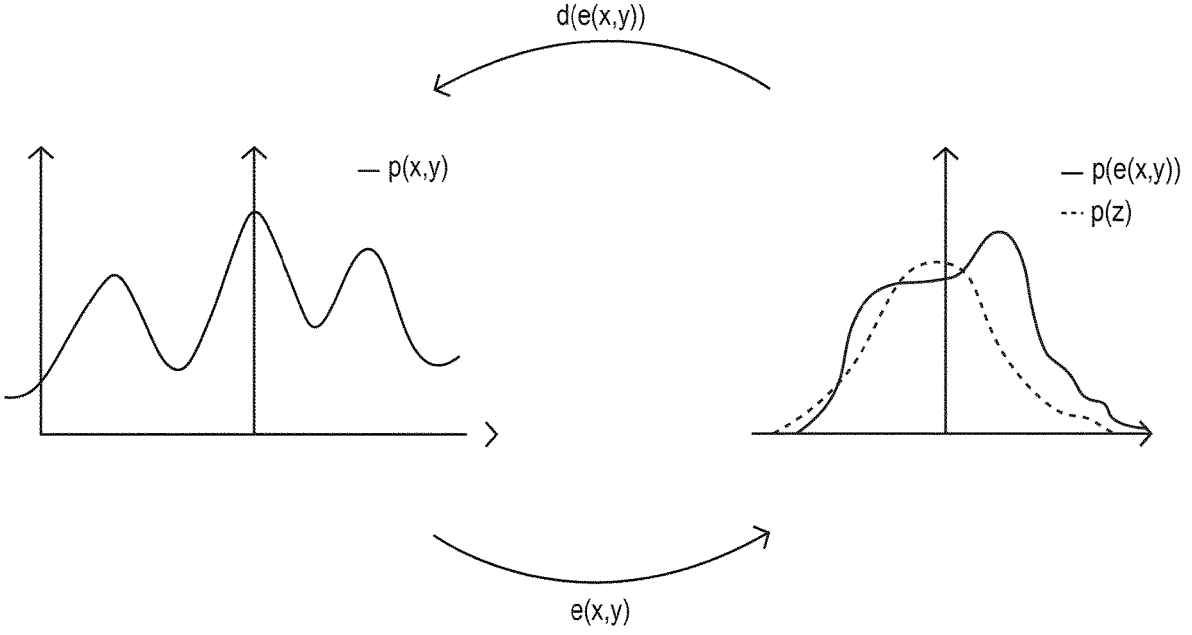
FIGURE 7
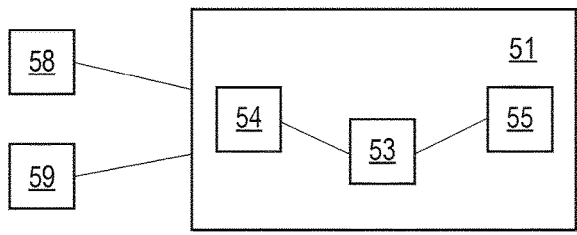
FIGURE 8

PROBABLISTIC SEGMENTATION

TECHNICAL FIELD

The present invention relates to a method, a computer program product and a computer system for machine-assisted segmentation of a medical image such as a CT image.

BACKGROUND

Before performing a medical procedure such as treating a patient with radiation therapy, it is standard practice to take a medical image, for example a CT image of the relevant part of the patient and to create a treatment plan based on this image. For treatment planning, the different parts of the patient, such as a tumor and/or different organs, need to be delineated in the medical image. This delineation is known as segmentation and is recognized as a difficult task to perform, both manually and automatically. The correct segmentation of a tumor, and in some cases of a particular organ, may be difficult to determine with certainty. Even experienced oncologists can obtain very different results when segmenting the same image.

Methods for automatic segmentation are known in the art. Such methods can yield good results but are often limited to the prediction of one segmentation per patient. In some cases, in particular if the input data is constructed by a set of medical practitioners with very different preferences, the model is implicitly forced to somehow average over these preferences. This may yield results that sometimes are not realistic.

A widely used method for automatically generating one segmentation per patient involves training a deep neural network of U-net type. Formally, the setup is as follows: Consider a dataset of n manually delineated medical images $(x_i, y_i) \sim p_{X,Y}$ for $i=1, 2, \ldots, n$, where $x_i$ is the i'th medical image and $y_i$ is an associated delineation done manually by a medical practitioner. The segmentation problem is then solved by searching for a classifier $f \in F$ in a predefined set of U-net based neural networks that minimizes the empirical risk $$f^* = \mathrm{argmin}_{f \in F} \frac{1}{n} \sum_{i=1}^{n} L(g(x_i), y_i)$$

with respect to some loss function L. The last layer of the U-net uses a probability normalizing activation function such as softmax, so that the output associated with each voxel can be interpreted as probabilities of that voxel belonging to each of the available classes, typically one class for each of the one or more structures that are to be segmented and one class for all voxels that do not belong to any of these structures. For instance, if the target would be to delineate a tumor and one organ, there would be one class for the tumor, one for the organ and one for the background. A segmentation for a new patient $x_{n+1}$ can then be predicted by evaluating the classifier, that is, $y_{n+1} = f^*(x_{n+1})$, and then choosing the most probable class for each voxel.

Instead of producing one proposal segmentation per input image, a probability distribution over the space of segmentations conditioned on the input image may be considered. This subject was investigated heavily in the paradigm of classical machine learning, that is, with shallow models. One prominent example is conditional random fields, which are discussed in detail, for example in Sutton, Charles, and Andrew McCallum. "An introduction to conditional random fields." Foundations and Trends® in Machine Learning 4.4 (2012): 267-373. Conditional random fields, or CRFs, can be used to obtain a probability distribution over the space of possible segmentations, which may be used to sample out proposal segmentations given an input image. Since a probability distribution over the whole space is known, a user can manually correct parts of the segmentation and then do a maximum likelihood estimation conditioned on the correction. These properties make CRFs interesting model candidates for image segmentation. However, since they are shallow models, they are not able to learn complicated relationships in the data. This makes them not viable for most modern medical image segmentation tasks.

Several deep learning methods have been proposed to boost the classical probabilistic segmentation methods with the flexibility of the deep models. For example, in Simon A. A. Kohl et al.: A Probabilistic U-Net for Segmentation of Ambiguous images, 32nd Conference on Neural information processing Systems (NeurIPS 2018), a probabilistic method based on a combination of a U-net and a variational auto-encoder is evaluated. Methods like these let the user sample out proposal segmentations from a learnt distribution conditioned over an input image, and sometimes, to compute a maximum likelihood estimate. However, these prior art methods cannot be used for interactive segmentation.

SUMMARY

It is an object of the present invention to provide improved segmentation of images suitable for use in medical planning procedures, such as radiotherapy treatment planning.

The invention relates to a computer-implemented method of determining an improved segmentation of a medical image including a set of pixels or voxels, comprising the steps of providing the medical image to a neural network based machine learning system that has been trained by means of training data sets comprising manually made segmentations, to determine if a segmentation is similar to the segmentations in the training dataset, obtaining an initial segmentation of the medical image from the machine learning system, manually adjusting the initial segmentation, and updating, by the machine learning system, the initial segmentation to produce an updated segmentation.

The method according to the invention therefore enables a segmentation to be selected by a combination of automatic and manual input. The automatic selection is based on probabilities, determined as the probability of the whole segmentation being feasible, taking a user's input into account. This ensures that the resulting segmentation will be one that is deemed reasonable by a qualified medical practitioner while reducing the risk of errors caused by incorrect interpretation. The method is applicable to different types of images, including CT and MR images. The user will typically be a medical practitioner, for example, an oncologist.

Hence, according to the invention, automatic segmentation is be improved by combining the use of a machine learning system with the possibility of manual adjustments based on the experience of a user, who may be a medical practitioner with experience in the relevant medical field, for example, an oncologist. This will help avoid segmentations are clearly not possible, for example, because the outline has a shape that is unlikely to occur naturally.

An embodiment of the method involves determining an improved segmentation of a medical image including a set X of pixels having given pixel values $x_i$ to a corresponding set Y of segmentation values $y_i$, using a machine learning system approximating the unnormalized conditional probability distribution $f(x,y) \approx C \cdot p(y|x)$ with a neural network, the method comprising:

a. obtaining an initial segmentation of a structure in the image in the form of a set Y of segmentation values $y_i$, said segmentation values $y_i$ indicating for each pixel if it belongs to the structure b. manually adjusting the initial segmentation by changing at least one of the segmentation values $y_i$ to produce an adjusted set Y' of segmentation values c. updating, by the machine learning system, the initial segmentation by optimizing the set Y of segmentation values based on the given pixel values $x_i$ and the adjusted set Y' of segmentation values.

In preferred embodiments, the sets are vectors. The set X may be real valued vector and the set Y may be a binary segmentation vector.

The steps of adjusting and updating may performed only one, or may be repeated using the updated segmentation as the initial segmentation, until the updated segmentation is found to be good enough, in the sense that the updated segmentation is one that could be made by a human operator, that is, it does not involve interpretations that an untrained machine might make but a human would consider unreasonable, such as sharp indentations into a structure. In this context, this means that it has the same properties as the images in the training data set.

In a preferred embodiment, the optimization is performed using an argmax function based on the pixels of the image, the segmentation values and a function f.

The method according to the invention is arranged to approximate the joint probability density function $p_{x,y}$ or the conditional density function $p_{(y|x)}$, possibly unnormalized, of pairs of images x and segmentations y with a deep neural network. It is designed in such a way that the model is able to capture complicated relationships in the data as well as making interactive segmentation possible.

The machine learning system used according to the invention is based on neural networks. More specifically, an almost everywhere differential neural network is used to approximate p(y|x) or p(x,y), possibly unnormalized, that can be evaluated in every point. This network can be generated by different methods, for instance, by means of a GAN or some variation of an auto-encoder, both of which are well known to the skilled person. The different types of network have different advantages and disadvantages. The term "almost everywhere differential" network in standard terminology in the technical field means that the function may be non-differential in some points, but the total volume of these points is zero.

In some embodiments, the machine learning system is a generative adversarial network—GAN—and the optimization is performed using a discriminator that has been trained to recognize a segmentation that are similar to those in a training dataset of segmentations that are or resemble manually made segmentations.

In some other embodiments, the machine learning system is an auto encoder and the optimization is performed using an encoder and a and the optimization is based on the score $f(x,y)=pZ(e(x,y))$.

GANs are known in the literature for being able to generate images (in this case segmentations) with very high level of detail, but can sometimes have troubles with mode collapse, where properties of the full distribution is not captured in a satisfactory way. Variations of auto-encoders on the other hand, for instance, variational auto-encoders, are known to generate less detailed images but with better distributional properties. Depending on the dataset, and problem, the choice of method may vary.

Segmentations of medical images are used in certain medical procedures, in particular for planning purposes. The invention therefore also relates to medical methods in which a segmentation produced according to a method such as the ones discussed above is used as a basis for planning medical treatments. As mentioned above, segmentations are useful in the planning of different types of medical procedures, including radiotherapy treatment and some surgical procedures.

Correspondingly, the invention also relates to method of training a machine learning system capable of generating a score to generate a segmentation of at least one structure in a medical image, comprising: Inputting a training data set comprising image data sets into the machine learning system, each image data set comprising a medical image together with one or more human generated and/or one or more machine generated segmentations of the at least one structure and training the machine learning system to recognize segmentations that are similar to those in the training dataset.

The invention also relates to a computer program product for generating an improved segmentation of a medical image including a set X of pixels having given pixel values x; comprising computer readable code means which, when run in a computer will cause the computer to perform the following steps:

a. obtaining an initial segmentation of a structure in the image in the form of a set Y of segmentation values $y_i$, said segmentation values $y_i$ indicating for each pixel if it belongs to the structure b. receiving manual input for adjusting the initial segmentation by changing at least one of the segmentation values $y_i$ and produce an adjusted set Y' of segmentation values based on the manual input c. updating, the initial segmentation by optimizing the set Y of segmentation values based on the given pixel values X and the adjusted set Y' of segmentation values d. optionally repeating steps b and c using the updated segmentation as the initial segmentation, until the updated segmentation is found to be good enough.

The invention also relates to a computer system for generating a segmentation of a medical image, comprising a processor, a program memory arranged to hold at least one computer program to be run in the processor, and a data memory, wherein the program memory holds a computer program product according to the above. The invention also relates to a method of training a machine learning system and to a machine learning system that has been trained according to the method.

BRIEF DESCRIPTION OF THE DRAWINGS

The invention will be described in more detail in the following, by way of example and with reference to the appended drawings, in which FIG. 1 is a flowchart of an overall method according to an embodiment of the invention;

FIGS. 2 and 3 are examples of possible segmentations with manual adjustments entered by a human;

FIG. 4 is a diagram showing the probability p for each of a number of possible segmentations of that segmentation being a plausible segmentation;

FIGS. 5 and 6 illustrate different parts of an embodiment of the method using a GAN;

FIG. 7 illustrates an embodiment of the method using an autoencoder;

FIG. 8 illustrates a computer system in which the inventive method may be implemented.

DETAILED DESCRIPTION

FIG. 1 is an overall flowchart of a method according to an embodiment of the invention. The method uses a machine learning system that is able to generate, based on an input set comprising a CT image and a possible segmentation of the CT image, a probability indicating how likely it is that a doctor would generate the segmentation. Before the system can be used to generate such a value, it must be trained based on a number of CT images, each with one or several segmentations associated with it. Various machine learning systems, and how to train them, are known to the skilled person. Some examples will be discussed in some detail below.

In step S51 a segmentation of a structure in a CT image is obtained, in any suitable way. The segmentation can be completely arbitrary. In step S52, a doctor considers the segmentation and makes a manual adjustment to a part of the structure. Some possible reasons for adjustment, and types of adjustment, will be discussed below. In step S53, the discriminator is used to update the segmentation to identify a segmentation that is deemed to be a plausible segmentation, in that there is a high likelihood that it could be arrived at by a doctor. This is performed as an optimization, which will be discussed below. Step S54 is a decision step for the user, to determine if the updated segmentation is good enough. If yes, the segmentation is output and may be used, for example, for treatment planning. If no, the procedure returns to step S52 or S53 for further adjustment. The user is typically a medical practitioner, depending on the procedure for which the segmentation is to be used.

In the following, the medical image that is to be segmented is denoted as x, the proposal segmentation for y and f(x,y) as our approximation of the unnormalized likelihood $C \cdot p(y|x)$, where C is some positive unknown constant. The updating in step S53 may be performed as an optimization according to the following: Mathematically, f is a high dimensional functional with 2N parameters, where the first N parameters, given by x, are associated with the image and represented by real numbers and the remaining N parameters, given by N, are binary and associated with the segmentation. If no restrictions are made on the number of voxels considered in the image, N is typically of order $100^3$.

In the following, the portion of the segmentation y that has been entered by the user is denoted $y_1$ and the portion of the segmentation that corresponds to the automatically generated segmentation is denoted $y_2$. For notational convenience, without loss of generality, in the following, only the case when there is one object to delineate against the background will be considered. The optimization problem to be solved can be expressed as finding the $y_2$ generating a maximal value of f for a given combination of x and $y_1$, that is, $$y_2{}^* = \mathrm{argmax}_{y_2 \in \{0,1\}^M} f(x,[y_1,y_2])$$

As per convention, f(x,y) denotes a neural network that assigns a score to how well y matches x according to a specific group of clinical practitioners. Assuming that the user of the system has manually provided a part of y denoted $y_1$ the rest of y may be denoted with $y_2$. Based on this, a prediction of $y_2$ may be generated by solving the argmax problem as defined above. This can be done in an iterative fashion, where a user starts by letting $y_1$ be empty, and then add parts of to $y_1$ and resolving the problem.

This optimization can be approached in many ways by methods known in the art. A simple solution might be simulated annealing, which is suitable for discrete problems without any simple structure. If all of the parameters for one regular segmentation is optimized over, this method will not be feasible. The size of the problem may however be reduced by excluding all voxels that are clearly either part of the segmented structure or not. In other words, the size may be reduced by excluding the voxels for which there is no or little uncertainty, resulting in a problem encompassing only the voxels for which it is uncertain if they belong to the structure or not. This can be defined by user input, or by a method identifying voxels which are uncertain. For example, the network can be a regular U-net that assigns an independent probability to each voxel and filter out the voxels that have less probability associated with every structure than a certain threshold probability.

In other words, the set X represents the pixels or voxels of a medical image and may be a real valued vector. The sets Y and Y' are preferably vectors, such as binary segmentation vectors were ones indicate foreground and zeros indicate background.

An alternative method, which is able to handle larger problems, is by continuous approximation of the basic problem. That is, by letting $y \in [0,1]^N$ take values in the unit cube rather than just the space of binary vectors $\{0,1\}^N$. This continuum can then be interpreted as either "the fraction of the voxel belonging to a structure" or "the probability of a voxel being in that structure". Such an approximation is sometimes done naturally to capture that a voxel on the boundary may only be part of some structure to a certain fraction. A requirement for this approximation is that the function f can be evaluated over the unit cube of dimension N $y \in [0,1]^N$ rather than just the space of binary vectors of dimension N $\{0,1\}N$. Also, the function f needs to be almost everywhere differentiable with respect to y. If $z \in R^M$ is defined by $y_2 = \mathrm{sigmoid}(z)$, where the sigmoid function operates elementwise, a gradient based optimization method such as gradient descent may be used to solve the optimization problem $$z^* = \mathrm{argmax}_z f(x,[y_1,\mathrm{sigmoid}(z)])$$

without any constraints. A final segmentation proposal can then be obtained by taking $$y_2^* = \mathrm{sigmoid}(z^*) \text{ or } y_2^* = \mathrm{round}(\mathrm{sigmoid}(z^*))$$

depending on whether binary or continuous representations are used. Here round( ) rounds off each element to 0 or 1 based on which of them are closest.

Given that the machine learning system is a neural network, the backpropagation algorithm may be used as an efficient way to implement gradient descent in a neural network. Such neural networks can be achieved in different ways. Examples of how to use the discriminator associated with a GAN or the encoder associated with a specific kind of auto-encoder will be discussed below.

FIG. 2 shows an initial segmentation y of an organ, as a solid line 21. In this example, a user considers that an area y1 outside of the segmentation, shown delineated by a dashed line 22, also belongs to the structure. Bearing in mind that the image is in 3D and may include a large number of slices, delineating the whole structure again according to this will be a lot of work. As an example, a CT scan of a spine may comprise approximately 200 slices.

According to embodiments of the invention, the user can mark one or more pixels within the segmentation as "definitely part of the structure" or "not part of the structure" or "on the edge of the structure". In this example, the user corrects the initial segmentation, marked by a solid line, by marking out some points along what they consider to be the edge of the structure. Alternatively, one or more points within the area y1 may be marked as belonging to the structure. The discriminator will then select among the possible segmentations that coincide with the user marking, one that has a high probability. This means that the discriminator will select a segmentation that looks reasonable, for example in that it includes a continuous structure incorporating adjacent pixels that have similar properties. The adjustments should be made in a suitable position in the structure to enable the discriminator to make the adjustment over the relevant part of the outline. For example, if only one adjusted point is entered, it should typically be in the middle of the portion of the outline that is to be corrected.

FIG. 3 shows another situation, illustrating the importance of considering the probability of the segmentation as a whole. In a) a possible initial segmentation $y_{init}$ of a structure is shown as a solid line. In this example, a user assessing the segmentation considers it is clear that everything within the smaller area $y_{corr}$ to the left of the dashed line belongs to the structure whereas the area $y_{not}$ between the dashed line and the solid line on the right is not part of the structure. The voxels in this area $y_{not}$ seem to have uniform properties. This whole area, therefore, should either be included or excluded in the segmentation of the structure. In this example, the doctor considers that it should be excluded. As for FIG. 2, delineating the part of the structure that needs to be changed in 3D manually involves a lot of work.

As in the previous example, the user can mark one or more pixels within the segmentation as "part of the structure" or "not part of the structure" or "on the edge of the structure". b) shows three such points, p1, p2, p3 set by the doctor to identify the border of the structure. To facilitate the calculations the points are selected more or less evenly distributed over the portion of the outline that is to be adjusted. As can be seen in b), the resulting structure of adding these three points to the segmentation has a very unlikely shape for any structure, with three sharp dents into the initial segmentation $y_{init}$, and would likely have the probability zero. According to this embodiment of the invention, therefore, our approximation of the unnormalized probability distribution C·p(y|x), is used to identify the most likely segmentations that fulfil the requirements added by the user. The resulting segmentation will probably look like the one shown in c), that is, the whole area outside of the dashed line is considered not to be a part of the structure.

FIG. 4 is a simplified diagram in one dimension illustrating the unnormalized likelihood approximation f(x,y) as a function of y while keeping x fixed to one specific input image. Two segmentations, $y_1$ and $y_2$ are marked on the horizontal axis and as can be seen, the evaluation of the first segmentation $f(x,y_1)$ is much lower than $f(x,y_2)$. This means, according to the model, that it is much more likely that a doctor would manually have delineated the patient as $y_2$ rather than $y_1$.

Using the values represented in FIG. 4, one of the possible segmentations may be selected to be used as a starting point to arrive at a more plausible segmentation by means of a gradient method. The change in probability between the selected segmentation and the one immediately to the right and left of it is determined and the one that results in the greatest increase in probability is selected. The procedure then continues in the same direction until there is no longer an increase in the probability. In that way, a segmentation having a high probability should be reached, although as can be seen, not necessarily the segmentation having the highest possible probability. Starting from the first segmentation $y_1$, therefore, the segmentation to the right of it should be selected repeatedly until there is no positive gradient on the curve, where the probability no longer increases. The segmentation selected by this procedure may be evaluated by a user, who may then make further adjustment to the selected segmentation to provide a new starting point. The procedure may then be repeated starting from the new starting point. In principle, any segmentation that coincides with the user specified corrections may be used as a starting point. For instance, one could fix the user specified variables and randomly draw the rest of the variables as independent U[0,1] variables. Another way would be to use the output of a classical U-net model to populate the free variables. That is, again, freeze the variables associated with user input and use the U-net output as starting points for the variables for which the optimization will be performed.

The machine learning system used according to the invention may be any type of system that is capable of generating a score reflecting the probability that a certain segmentation was generated by a doctor.

The machine learning system may be any suitable type of neural network, trained in any suitable way. For instance, one may use a part of a Generative Adversarial Network (GAN), known per se. Such networks were first described in Goodfellow, Ian, et al. "Generative adversarial nets." Advances in neural information processing systems. 2014. With a GAN, two competing neural networks are used, a generator and a discriminator. During training, a number of training sets, each comprising a medical image and one or more segmentations of one or more structures in the medical image, are fed to the discriminator. Some segmentations are authentic segmentations of the medical image, typically created manually and others are generated by the generator. The generator strives to create pictures, or in the context of this invention, segmentations, that will be perceived as authentic, while the discriminator strives to differentiate between authentic and machine-made segmentations. In this way, the generator and the discriminator trigger each other to become better.

The function of the GAN generator can be expressed as $$g_w(\text{medical image,noise}) \rightarrow \text{segmentation of tumor and/or organ}$$

The noise is randomly generated to provide a variation of segmentations when the generator is run several times.

The GAN generator works according to the equation $$g_w(x)=y$$

where g is a function subjected to one or more weights w, where the weights may be adjusted such that for each CT image x a binary image y will be generated in which each pixel is identified as either belonging or not belonging to the structure. The process of training a GAN generator is known to the skilled person.

In this way, the generator is trained to generate segmentations that are increasingly similar to authentic segmentations created by a human, while the discriminator is trained to make the distinction between authentic and machine-made segmentations with greater accuracy. Formally, the discriminator is trained to approximate the probability distribution $$d(x,y) \approx p(b=1|x,y)$$

where b is a variable taking the value 1 if a segmentation is done by a human and the value 0 otherwise. Since $$p(b|x,y) \propto p(y|x,b)$$

and b is fixed as b=1, d is proportional to the desired probability distribution, that is, the probability that a doctor would have delineated a medical image x with y. Since the discriminator is a neural network proportional to the likelihood p(y|x), the next step may be to find a partial segmentation as described above with f(x,y)=d(x,y).

FIG. 5 is a flow chart of a possible method, known per se, for automatic generation of segmentations using a GAN. In a first step S61, a CT image and some general noise is input to the generator. In step S62, the generator creates a segmentation based on the input data from step S61. The segmentation is output in step S63. This procedure may be repeated as many times as desired, if a set of segmentations is desired.

FIG. 6 is a flowchart of an embodiment of the inventive method performed by making use of the discriminator. In step S71 a CT image and a segmentation of the relevant part of the CT image is input to the discriminator. The segmentation may be obtained in any suitable way, for example manually or by the process of FIG. 1 or FIG. 5. In step S72, the discriminator generates a score S73 indicative of how likely it is, given the CT image, that the segmentation was made by a doctor. If necessary, the segmentation may be adjusted manually, in step S74, and submitted again to the discriminator. This is typically done if the likelihood is too low, that is, if the segmentation is too far from a segmentation that a doctor would generate, or if the doctor determines that manual adjustment is desirable. It is also possible to perform a manual adjustment like the one in step S74 before step S72.

The discriminator is arranged to generate an optimized segmentation by solving the problem $\text{argmax}_y$ f(x,y), f being the discriminator. The doctor will consider the output from the discriminator and, if necessary, perform an adjustment in step S74 and revert to step S72 to and generate a new optimized segmentation. That is, if a correction is provided, y will be split up into y_1 and y_2, where y_1 is the provided adjustments. Then argmax $_{y2}$ f(x,[y$_1$,y$_2$]). This will then be repeated until the results are satisfactory to the user.

As an alternative, the machine learning model can be a version of an auto-encoder. Such networks, and how they may be set up, are known per se. One way to set them up may be described as follows, with reference to FIG. 7: The auto-encoder must be regularized in a way such that the data in the latent-space looks approximately $p_Z$-distributed, schematically illustrated by the dashed curve in the rightmost coordinate system. Formally, consider again a dataset of n manually delineated medical images images $(x_i, y_i) \sim p_{X,Y}$, where an example of $p_{X,Y}$ is shown in the leftmost coordinate system. Let a neural network encoder be denoted with $e \in E$ and a neural network decoder be denoted with $d \in D$, where E and D are two predefined sets of neural networks. The encoder is illustrated in FIG. 7 by an arrow denoted e(x,y) pointing from the leftmost to the rightmost coordinate system and the decoder is illustrated by an arrow denoted d(x,y) pointing in the opposite direction. Let $L_R$ be some reconstruction loss for both x and y and $L_Z$ be some loss associated with how close the empirical distribution of the datapoints in the latent space are to the target distribution $p_Z$. This corresponds to a an average of dirac measures taking values in a couple samples from the distribution depicted with the solid curve p(e(x,y)) in the rightmost coordinate system. The network is then trained by solving $$\text{argmin}_{e \in E, d \in D} \frac{1}{n} \sum_{i=1}^{n} L_R(d(e(x, y)), x, y) + L_Z\left(\frac{1}{n} \sum_{i=1}^{n} \delta\{e(x_i, y_i)\}\right),$$

where $\delta$ is the indicator function, and the resulting encoder is used to approximate the joint distribution $f(x,y)=p_Z(e(x, y)) \approx p_{X,Y}(x,y)$, necessary for our method described above.

Furthermore, if $f_z$ is chosen to be almost everywhere differentiable, for instance normally distributed, this optimization problem described in above for updating segmentations given f, can be solved with a back-propagation scheme.

For example, let the network be a fully convolutional encoder and a fully convolutional decoder, let all the activation functions be ReLU-activations and let the output of the decoder that is associated with the segmentation, pass through a softmax activation as the last layer. The loss functions can be defined such that the reconstruction of x is given by a least squares loss and the reconstruction for y is given by the mean cross entropy loss. Finally, the regularizer loss $L_Z$ may be given by the Wasserstein loss. In order to train this model, stochastic gradient descent with mini batches can not be used in the standard way since the regularizer term is dependent on all of the datapoints in the dataset. To handle this, we approximate the regularizer term for a minibatch of the pair $(x_j, y_j)$ with $$L_Z = \left(\frac{1}{n} \sum_{i=1}^{n} \delta\{e(x_i, y_i)\}\right) \approx L_Z\left(\delta\{e(x_j, y_j)\} + \frac{1}{T-1} \sum_{i=1}^{T-1} \delta_i\right)$$

where $\delta_0$ is the first evaluated latent point and $\delta_{T-1}$ was the previously evaluated latent point during training. This specifies all of the free parameters that are included in the model.

FIG. 8 is a schematic representation of a computer system in which the inventive planning method may be performed. A computer 51 comprises a processor 53, a data memory 54 and a program memory 55. Preferably, a user input means 58 is also present, in the form of a keyboard, a mouse, a joystick, voice recognition means or any other available user input means.

The data memory 54 comprises data such as images and possible segmentation, and typically one or more objective functions. The data in the data memory may be generated in the computer 51, entered by means of the user input means or received from another storage means, in any way known in the art.

As will be understood, the data memory 54 is only shown schematically. There may be several data memory units, each holding one or more different types of data, for example, one data memory for the value set, one for the objective function, etc.

The program memory 55 holds a computer program arranged to control the processor to perform the inventive method. It will be understood that not all of the method steps are necessarily performed in the computer 51.

The invention claimed is:

1. A computer-implemented method of determining an improved segmentation of a medical image, comprising: providing the medical image to a neural network based machine learning system that has been trained by means of training data sets comprising manually made segmentations, to determine if a segmentation is similar to the segmentations in the training dataset, wherein the medical image includes a set X of pixels or voxels having given pixel values x to a corresponding set of Y of segmentation values y; obtaining an initial segmentation of the medical image from the machine learning system in the form of a set Y of segmentation values y, said segmentation values y indicating for each pixel if it belongs to the structure, wherein the machine learning system approximates the unnormalized conditional probability distribution with a neural network; manually adjusting the initial segmentation by changing at least one of the segmentation values y to y1 and produce an adjusted set Y' of segmentation values y'=[y1,y2]; and updating, by the machine learning system, the initial segmentation to produce an updated segmentation by optimizing the set Y of segmentation values based on the given pixel values x and the adjusted set Y' of segmentation values, by solving the optimization problem.

2. The method of claim 1, further comprising repeating the manually adjusting and the updating, using the updated segmentation as the initial segmentation, until the updated segmentation is found to be good enough.

3. The method of claim 1, wherein the optimization problem is solved by means of simulated annealing.

4. The method of claim 1, wherein the optimization problem is solved by means of continuous approximation of the basic problem.

5. The method of claim 1, wherein the machine learning system is a generative adversarial network and the optimization is performed using a discriminator that has been trained to recognize a segmentation that are similar to those in a training dataset of segmentations that are or resemble manually made segmentations.

6. The method of claim 1, wherein the machine learning system is an auto encoder and the optimization is performed using an encoder and wherein the optimization is based on the score $f(x,y)=pz(e(x,y))$.

7. A medical planning method including segmenting a medical image according to claim 1 and using the segmented medical image as a basis for planning.

8. A computer program product for generating an improved segmentation of a medical image, the computer program product comprising computer readable code means which, when run in a computer will cause the computer to perform the following steps: receiving the medical image at a neural network based machine learning system that has been trained by means of training data sets comprising manually made segmentations, to determine if a segmentation is similar to the segmentations in the training dataset, wherein the medical image includes a set X of pixels or voxels having given pixel values x to a corresponding set of Y of segmentation values y; obtaining an initial segmentation of a structure in the image in the form of a set Y of segmentation values y, said segmentation values y indicating for each pixel if it belongs to the structure, wherein the machine learning system approximates the unnormalized conditional probability distribution with a neural network; receiving manual input for adjusting the initial segmentation by changing at least one of the segmentation values y to y1 and produce an adjusted set Y' of segmentation values $y'=[y_1,y_2]$ based on the manual input; updating, by the machine learning system the initial segmentation to produce an updated segmentation by optimizing the set Y of segmentation values based on the given pixel values x and the adjusted set Y' of segmentation values by solving the optimization problem; and optionally repeating the receiving and updating, using the updated segmentation as the initial segmentation, until the updated segmentation is found to be good enough.

9. A computer system for generating a segmentation of a medical image, comprising a processor, a program memory arranged to hold at least one computer program to be run in the processor, and a data memory, wherein the program memory holds a computer program product according to claim 8.

\* \* \* \* \*